United States Patent
Okamura et al.

[11] Patent Number: 6,078,508
[45] Date of Patent: Jun. 20, 2000

[54] SELF-OSCILLATION TYPE SWITCHING POWER SUPPLY APPARATUS

[75] Inventors: Ryuji Okamura; Naoki Tanaka, both of Nagaokakyo, Japan

[73] Assignee: Murata Manufacturing Co., Ltd., Japan

[21] Appl. No.: 09/238,805

[22] Filed: Jan. 28, 1999

[30] Foreign Application Priority Data

Feb. 13, 1998 [JP] Japan .................................. 10-031144

[51] Int. Cl.[7] .................................................. H02M 3/335
[52] U.S. Cl. .................................................. 363/19; 363/18
[58] Field of Search .................................. 363/18, 19, 95, 363/97, 131

[56] References Cited

U.S. PATENT DOCUMENTS

| | | | |
|---|---|---|---|
| 4,630,186 | 12/1986 | Kudo ........................................... | 363/19 |
| 4,758,937 | 7/1988 | Usui et al. ................................ | 363/19 |
| 4,763,236 | 8/1988 | Usui ........................................... | 363/19 |
| 4,802,076 | 1/1989 | Asai . | |
| 4,862,338 | 8/1989 | Tanaka ....................................... | 363/19 |
| 4,937,724 | 6/1990 | Nakajima ................................... | 363/56 |
| 5,012,399 | 4/1991 | Takemura et al. ......................... | 363/18 |

OTHER PUBLICATIONS

Patent Abstract of Japan—05/172,499 "Switching Power Supply Apparatus" Dated Jun. 18, 1993.

*Primary Examiner*—Matthew Nguyen
*Attorney, Agent, or Firm*—Ostrolenk, Faber, Gerb & Soffen, LLP

[57] ABSTRACT

A self-oscillation type switching power supply apparatus comprises: a transformer T having a primary winding N1, a secondary winding N2, and a feedback winding $N_B$; a switching transistor Q1 for interrupting a current in said primary winding N1; a controlling transistor Q2 for controlling a positive feedback signal for said switching transistor Q1 from said feedback winding $N_B$; a time constant circuit adapted to be charged by a voltage produced in said feedback winding $N_B$ at a predetermined time constant and to give a controlling voltage to said controlling transistor $Q_2$; a light emitting element of a photocoupler provided in a circuit for detecting an output voltage or output current from the secondary of said transformer T; a photodetector of said photocoupler connected to said time constant circuit whereby the time constant of said time constant circuit is changed in dependence on the detection of the output voltage or output current to stabilize the output voltage or output current; and a conducting path provided between an input power-supply voltage supplying section for the primary of said transformer T and a voltage-supplying section for said photodetector of the photocoupler.

21 Claims, 3 Drawing Sheets

SELF-OSCILLATION TYPE SWITCHING POWER SUPPLY APPARATUS

BACKGROUND OF THE INVENTION

1. Field of the Invention

The present invention relates to a self-oscillation type switching power supply apparatus.

2. Description of the Related Art

As a self-oscillation type switching power supply apparatus, ringing choke converters have been conventionally used in most cases. FIG. 3 is a circuit diagram showing the structure of a conventional ringing choke converter. As seen in FIG. 3, an AC power supply AC is connected to the input terminal of a rectifying diode bridge DB1 through a fuse F and a line filter LPF. To the output terminal of the diode bridge DB1, a smoothing capacitor C1 is connected. A rectifying smoothing circuit formed of a rectifying diode D3 and a smoothing capacitor C5 in series with each other are connected across the opposite ends of a secondary winding N2 of a transformer T. At the output of the rectifying smoothing circuit, a resistor voltage dividing circuit formed of resistors R9, R10 and a voltage detecting circuit made up of a shunt regulator SR, a light emitting diode PD of a photocoupler, and a resistor R8 are provided.

A switching transistor Q1 is connected in series with a primary winding N1 of the transformer T. To a feedback winding $N_B$ of the transformer T, a controlling circuit containing a phototransistor PT as the photodetector of the photocoupler is connected. A starting-up resistor R1 is connected between the gate of the switching transistor Q1 and the input power-supply voltage supplying-section.

The operation of the circuit shown in FIG. 3 will be now described. At start up when the power supply is put to work, voltage is applied to the gate of the switching transistor Q1 through the starting resistor R1, so that the switching transistor Q1 is turned on. Thereby, an input power supply voltage is applied to the primary winding N1 of the transformer T, so that a voltage is produced in the feedback winding $N_B$ in the same direction as that in the primary winding N1. The voltage signal is provided as a positive feedback signal to the gate of the switching transistor Q1 through a resistor R2 and a capacitor C2. The voltage produced in the feedback winding $N_B$ also causes a charging current to flow to a capacitor C3 through a diode D1, resistors R3, R5, and the phototransistor PT of the photocoupler. The capacitor C3 and a resistor R4 constitute a time constant circuit, and when the charging voltage of the capacitor C3 exceeds the base—emitter forward voltage of the controlling transistor Q2, the controlling transistor Q2 is turned on. Thereby, the gate—source voltage of the controlling transistor Q1 becomes substantially zero, so that the controlling transistor Q1 is forced to turn off. At this time, a voltage is produced in the secondary winding of the transformer T in the forward direction with respect to the rectifying diode D3, and thereby, energy stored in the transformer T while Q1 is on is released through the secondary winding N2. The diode D2, the resistors R6, R7, and the capacitor C4 form a discharging time constant setting circuit for the capacitor C3. With this circuit, the capacitor C3 is reverse-charged (discharged) with the flyback voltage from the feedback winding $N_B$.

When the voltage of the capacitor C3 goes lower than the base—emitter forward voltage of the controlling transistor Q2, the controlling transistor Q2 is turned off. The energy stored in the transformer T is released into the secondary, and the current in the rectifying diode D3 becomes zero. Then, the respective winding voltages of the transformer T become zero. The circuit is returned to its initial state, and then, the switching transistor Q1 is turned on. Succeedingly, the above-described operation is repeated.

The output voltage on the load side is detected as a voltage divided by the resistors R9, R10. The divided voltage is applied as a detection voltage and a control voltage for the shunt regulator SR. The shunt regulator SR regulates the conducting quantity of electricity for the light emitting diode PD of the photocoupler in dependence on the detection voltage. By the regulation, the quantity of light received by the phototransistor PT, as the photodetector of the photocoupler, is changed, causing the impedance of the phototransistor PT to change. As a result, the charging time constant of the capacitor C3 is changed. As the output voltage is lower, so the charging time constant is higher. That is, as the output voltage is lower, the period from the time when the switching transistor Q1 is turned on until it is forced to be turned off by the controlling transistor Q2, namely, the on-state time period of the switching transistor Q1 is longer. This acts so that the output voltage is increased. Thus, the constant voltage control for keeping the output voltage constant is achieved.

In the conventional self-oscillation type switching power supply apparatus as shown in FIG. 3, in the event that the input power-supply voltage is reduced to be lower than the rated voltage, for example, the AC power supply AC is interrupted, the voltage applied to the primary winding N1 of the transformer T when the switching transistor Q1 is on is reduced. In proportion to the reduction of the voltage, the voltage produced in the feedback winding $N_B$ is reduced. Accordingly, even if the load is constant, the rising of the charging voltage of the capacitor C3 lags, so that the period from the time when the switching transistor Q1 is turned on to the time when the controlling transistor Q2 is turned on, namely the on-state time-period of transistor Q1 becomes longer. As a result, as the input power-supply voltage is reduced, the output voltage supplied to the load is temporarily raised (spring up). Thereafter, the output voltage is gradually reduced (hereinafter, the spring-up of the output voltage occurring when the input power-supply voltage is reduced is referred to as overshoot). Especially, when the load is light, the rising of the output voltage, caused by the increase of the on-state time-period of the switching transistor Q1, is directly reflected so that a significant overshoot occurs. Such an overshoot may cause an error operation or fault of the connected powered circuit, depending on the type of the load.

SUMMARY OF THE INVENTION

It is therefore an object of the present invention to provide a self-oscillation type switching power supply apparatus in which the output voltage is prevented from springing up (overshooting) when the input power-supply voltage is reduced.

According to the present invention, there is provided a self-oscillation type switching power supply apparatus comprising a transformer T having a primary winding N1, a secondary winding N2, and a feedback winding $N_B$, a switching transistor Q1 for interrupting a current in the primary winding N1, a controlling transistor Q2 for controlling a positive feedback signal for the switching transistor Q1 from the feedback winding $N_B$, a time constant circuit adapted to be charged by a voltage produced in the feedback winding $N_B$ at a predetermined time constant and provide a controlling voltage to said controlling transistor Q2, a light emitting element of a photocoupler provided in a circuit for detecting an output voltage or output current from the secondary of the transformer T, and a photodetector of the photocoupler connected to the time constant circuit whereby the time constant of the time constant circuit is changed in dependence on the detection of the output voltage or output current to stabilize the output voltage or output current, wherein a conducting path is provided between an input power-supply voltage supplying section for the primary of said transformer T and a voltage-supplying section for the photodetector of the photocoupler.

With this arrangement, in the event that the voltage produced in the feedback winding $N_B$ when the switching transistor Q1 is on is reduced, a voltage is supplied directly to the photodetector of the photocoupler from the input power-supply, and thereby, the stabilization control of the output voltage or output current through the photocoupler is continuously carried out. Accordingly, even if the voltage produced in the feedback winding is reduced in the process where the input power-supply voltage is reduced, the output voltage is prevented from spring up (overshooting).

The conducting path may include a starting-up resistor connected between the input power-supply voltage supplying section for the primary of the transformer T and a controlling voltage inputting section for the switching transistor Q1, and a by-pass circuit containing a resistor connected between the controlling voltage inputting section for said switching transistor Q1 and the voltage-supplying section for said photodetector PT of the photocoupler. In the case of a relatively high power-supply voltage, for example, in the case where as the input power supply, a commercial AC power supply rectified and smoothed is used, it is required to supply a voltage to the photodetector of the photocoupler from the input power-supply through a resistor having a high resistance. However, with the above-described arrangement, the starting-up resistor, which is essential to the device, may also act to supply a voltage to the photodetector of the photocoupler. Thus, it is unnecessary to provide a further resistor for which the power consumption is large (high wattage).

In addition, a reverse current preventing diode D1 may be provided between the photodetector PT of the photocoupler and the feedback winding $N_B$, and a reverse current preventing diode D4 is provided in the by-pass circuit. With the arrangement, the reverse current from the controlling voltage inputting section for the switching transistor Q1 to the feedback winding $N_B$ is prevented. Further, when the input power-supply voltage is equal to the rated voltage, a voltage is supplied to the photodetector of the photocoupler from the feedback winding side, causing the interruption of the conduction through the starting-up resistor. Thus, the loss of power, caused by the starting-up resistor in the stationary state, can be reduced. For the purpose of illustrating the invention, there is shown in the drawings several forms which are presently preferred, it being understood, however, that the invention is not limited to the precise arrangements and instrumentalities shown.

DETAILED DESCRIPTION OF EMBODIMENTS OF THE INVENTION

Hereinafter, the preferred embodiments of the present invention are explained in detail with reference to the drawings.

The configuration of a self-oscillation type switching power supply apparatus according to a first embodiment of the present invention will be now described with reference to FIG. 1.

Figure 1:
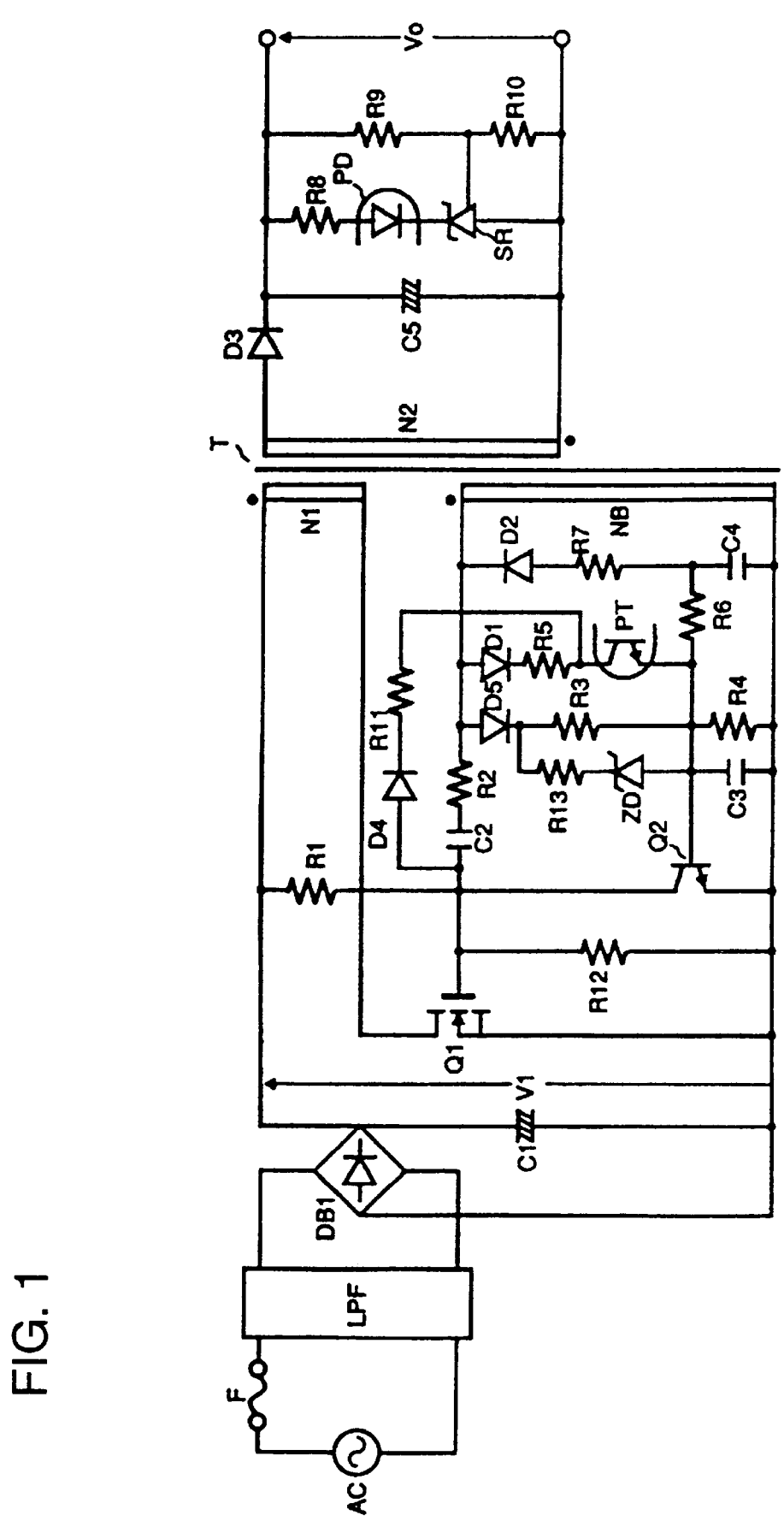
FIG. 1 is a circuit diagram showing the structure of a self-oscillation type switching power supply apparatus according to a first embodiment of the present invention.

As shown in FIG. 1, an AC power source AC is connected to the input terminal of a rectifying diode bridge DB1 through a fuse F and a line filter LPF. To the output terminal of the diode bridge DB1, a smoothing capacitor C1 is connected. A rectifying smoothing circuit formed of a rectifying diode D3 and a smoothing capacitor C5 is connected across the opposite ends of a secondary winding N2 of a transformer T. For a rectifying, smoothing outputting section, a resistor voltage dividing circuit formed of resistors R9, R10 and a voltage detecting circuit made up of a shunt regulator SR, a light emitting diode PD of a photocoupler, and a resistor R8 are provided.

A switching transistor Q1 is connected in series with a primary winding N1 of the transformer T. To a feedback winding $N_B$ of the transformer T, a controlling circuit containing a phototransistor PT as the photodetector of the photocoupler is connected. A starting-up resistor R1 is connected between the gate of the switching transistor Q1 and an input power supply-voltage supplying-section.

Figure 3:
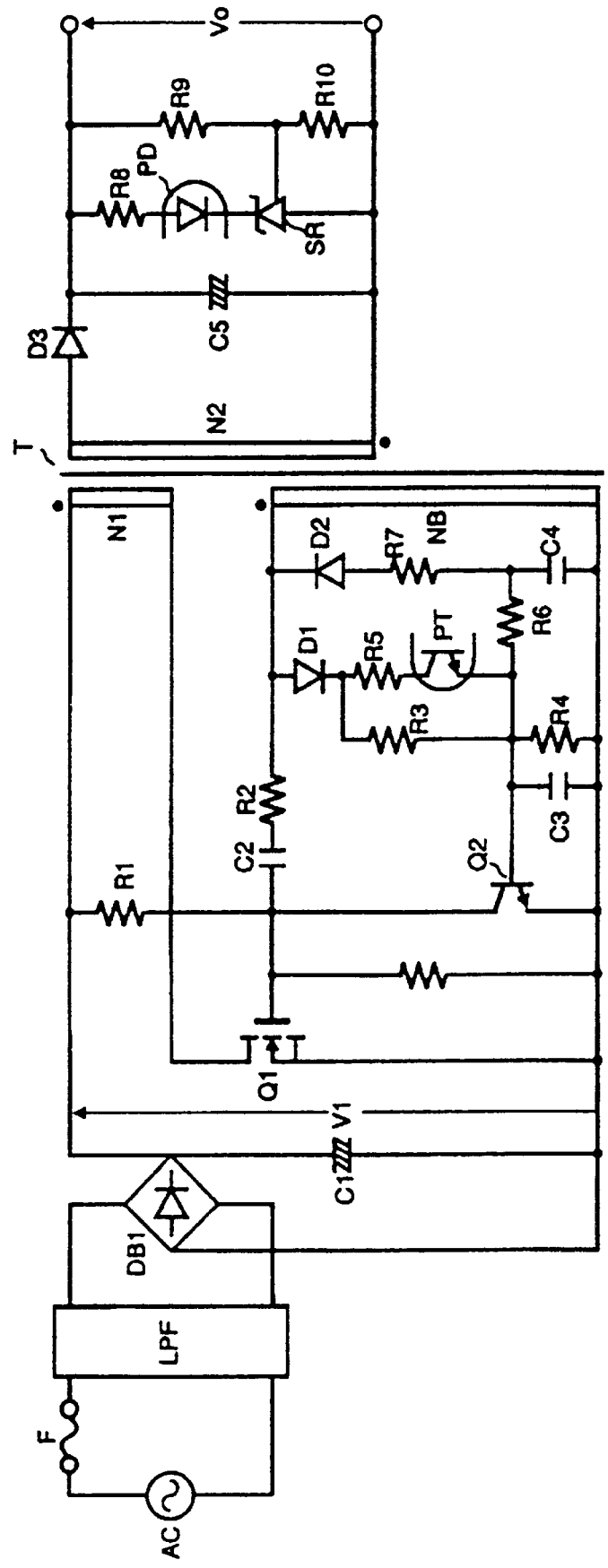
FIG. 3 is a circuit diagram showing the structure of a conventional self-oscillation type switching power supply apparatus.

In the self-oscillation type switching power supply apparatus shown in FIG. 1, as easily understood in comparison with the conventional self-oscillation type switching power supply apparatus of FIG. 3, a by-pass circuit formed of a diode D4 and a resistor R11 is connected between the control-voltage input side (gate) of the switching transistor Q1 and the collector of the phototransistor PT of the photocoupler. In the embodiment shown in FIG. 1, an overcurrent protecting circuit formed of a diode D5, resistors R3, R13, and a Zener diode ZD, a discharging time constant setting circuit for a capacitor C3, formed of a diode D2, resistors R6, R7, and a capacitor C4, and a time constant circuit formed of the capacitor C3 and a resistor R4 are provided, respectively. The resistor R4 controls the charging and discharging time constants of the capacitor C3.

In FIG. 1, when the terminal voltage of the smoothing capacitor C1, that is, an input power-supply voltage V1 is equal to the rated voltage, and the switching transistor Q1 is on, a voltage proportional to the voltage in the primary winding N1 of the transformer T is produced in the feedback winding $N_B$, and a charging current for the capacitor C3 flows through the route from the diode D1 to the capacitor C3, through the resistor R5 and the phototransistor PT. In the stationary state, the conduction may be caused through the route from the starting-up resistor R1 to the phototransistor PT through the diode D4 and the resistor R11. However, in the case where the resistances of the starting-up resistor R1 and the resistor R12 connected between the gate—source of the switching transistor Q1 are so set that the collector potential of the phototransistor PT is about 0.6–0.7V higher than the gate potential of the switching transistor Q1, the diode D4 is biased in the reverse direction. Accordingly, the loss of power due to the resistor R11 in the stationary state can be inhibited.

The overcurrent protecting circuit, formed of the diode D5, the resistors R3, R13, and the Zener diode ZD, has a function ZD, has a function of assuring the upper limit of the charging time constant for the capacitor C3 even if an overcurrent flows in the load, causing the output voltage $V_O$ to lower, and then the quantity of light received by the phototransistor PT becomes lowest. Further, a circuit formed of the diode D2, the resistor R7, and the capacitor C4 functions as a by-pass of the discharging-route for the capacitor C3 to set the discharging time constant for the capacitor C3 to a different value from the charging time constant. The resistor R4 is provided to set the charging and discharging time constants for the capacitor C3 to a predetermined value.

In the event that the AC power supply AC is interrupted, or an AC input is interrupted as its ordinary use form, the input power-supply voltage V1 is gradually reduced, caused by discharging of the smoothing capacitor C1. Thereby, the voltage applied to the primary winding N1 of the transformer T when the switching transistor Q1 is on is reduced, and in proportion to the reduction, the voltage produced in feedback winding $N_B$ is also reduced. As the voltage produced in the feedback winding $N_B$ is reduced, the voltage supplied from the feedback winding $N_B$ to the phototransistor PT is decreased. When the voltage is decreased until the diode D1 is biased in the reverse direction, a voltage is supplied through the route from the starting-up resistor R1 to the phototransistor PT, through the diode D4 and the resistor R11. The charging current is made to flow through the route from phototransistor PT to C3. At this time, the diode D1 prevents current from flowing in the reverse direction from the by-pass circuit formed of diode D4 and resistor R11 to the feedback winding $N_B$.

Accordingly, even if the voltage produced in the feedback winding $N_B$ is reduced to some degree, the control of the charging time constant is continued, caused by the voltage supplied from the input power supply. As a result, the lag of the turn-on of the controlling transistor Q2, namely, the prolongation of the on-state time-period of the switching transistor Q1, due to the lag of the rising of the charging voltage for the capacitor C3, is prevented. Thus, the overshoot of the output voltage $V_O$ is prevented.

Figure 2:
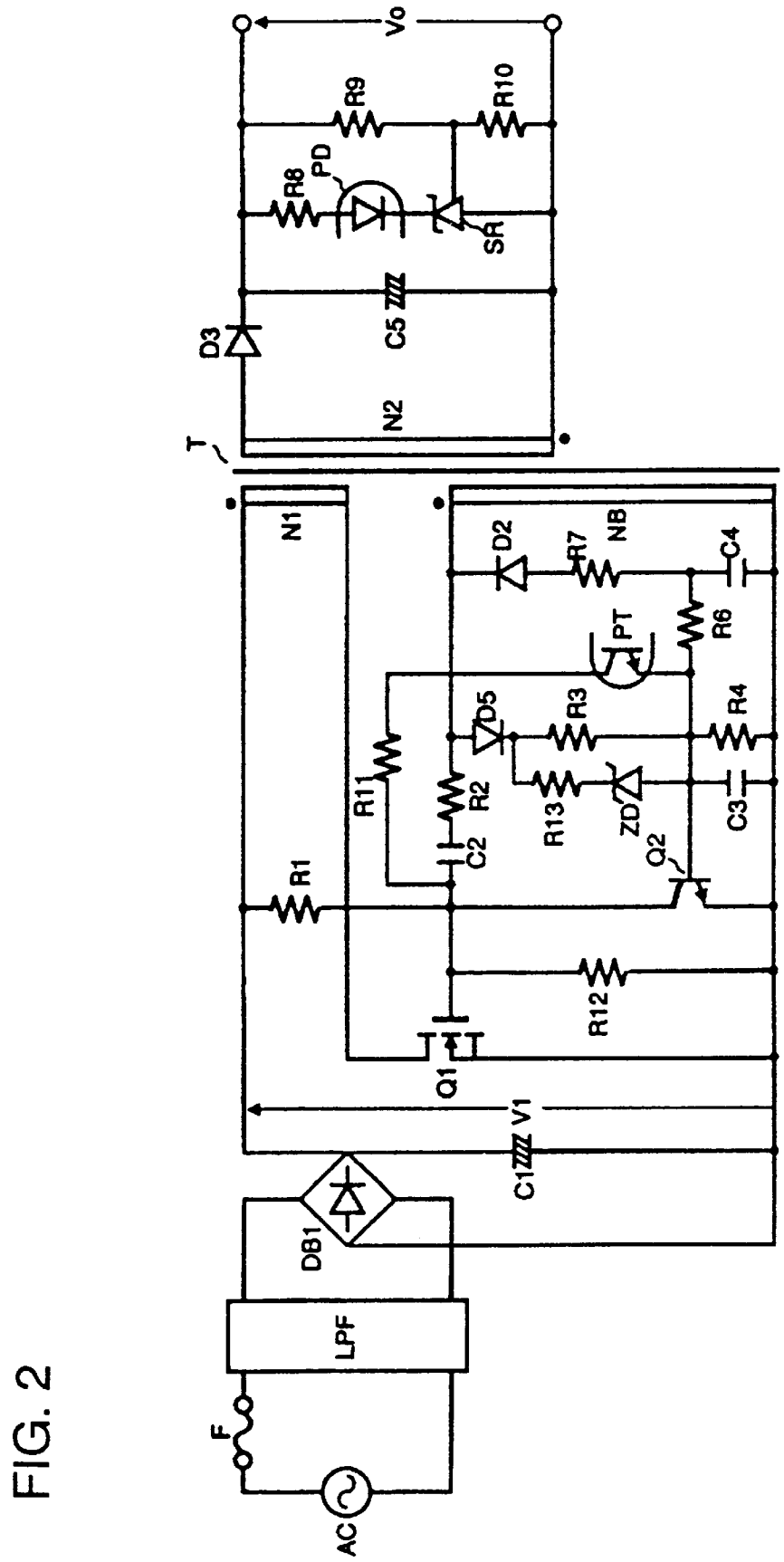
FIG. 2 is a circuit diagram showing the structure of a self-oscillation type switching power supply apparatus according to a second embodiment.

FIG. 2 is a circuit diagram showing the structure of a self-oscillation type switching power supply apparatus according to a second embodiment of the present invention. In the instant embodiment, the difference from the circuit of FIG. 1 lies in the fact that the diodes D1, D4 and the resistor R5, shown in FIG. 1, are excluded. With this arrangement, the phototransistor PT is always supplied with a voltage from the power supply. Accordingly, though the loss of power, caused by the starting-up resistor R1, is large, as compared with the case of the device of FIG. 1, the number of components can be reduced, since the diodes D1, D4, and the resistor R5 are removed.

In the embodiments of FIGS. 1 and 2, when the input power-supply voltage is reduced, a voltage is supplied to the phototransistor through the starting-up resistor R1. In addition to the starting-up resistor R1, another resistor having a high resistance may be provided, and through the resistor, a voltage may be supplied to the phototransistor PT from the input power-supply supplying-section.

In the embodiments of FIGS. 1 and 2, a constant voltage is outputted by detecting the output voltage and feedback controlling it. The present invention may be applied to a case where a constant current is outputted by detecting an output current and feedback controlling it.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A self-oscillation type switching power supply apparatus comprising:
    a transformer having a primary winding, a secondary winding, and a feedback winding;
    a switching transistor for interrupting a current in said primary winding;
    a controlling transistor for controlling a positive feedback signal for said switching transistor from said feedback winding;
    a time constant circuit adapted to be charged at a predetermined time constant and to provide a controlling voltage to said controlling transistor;
    a light emitting element of a photocoupler provided in a circuit for detecting an output voltage or output current from the secondary of said transformer;
    a photodetector of said photocoupler connected between the feedback winding and said time constant circuit such that the time constant of said time constant circuit is changed in dependence on the detection of the output voltage or output current to stabilize the output voltage or output current; and
    a conducting path provided between an input power-supply voltage supplying section for the primary of said transformer and a voltage-supplying section for said photodetector of the photocoupler.

2. The self-oscillation type switching power supply apparatus of claim 1, wherein said conducting path includes a starting-up resistor connected between said input power-supply voltage supplying section for the primary of said transformer and a controlling voltage inputting section for said switching transistor, and a by-pass circuit comprising a resistor connected between said controlling voltage inputting section for said switching transistor and said voltage-supplying section for said photodetector of the photocoupler.

3. The self-oscillation type switching power supply apparatus of claim 2, wherein a reverse current preventing diode is provided between said photodetector of the photocoupler and said feedback winding, and a reverse current preventing diode is provided in said by-pass circuit.

4. The self-oscillation type switching power supply apparatus of claim 1 further comprising an overcurrent protecting circuit coupled between the time constant circuit and said feed back winding for assuring an upper limit of a charging time constant for the time constant circuit.

5. The self-oscillation type switching power supply apparatus of claim 4, wherein the overcurrent protecting circuit comprises a diode coupled in series with a parallel circuit comprising a first resistor and zener diode coupled in parallel with a second resistor and coupled to the time constant circuit.

6. A self-oscillation type switching power supply apparatus comprising:
    a transformer having a primary winding, a secondary winding, and a feedback winding;
    a switching transistor for interrupting a current in said primary winding;
    a controlling transistor for controlling a positive feedback signal for said switching transistor from said feedback winding;
    a time constant circuit adapted to be charged at a predetermined time constant and to provide a controlling voltage to said controlling transistor;

a circuit for detecting an output voltage or output current from the secondary of said transformer and for providing a first signal related to the output voltage or output current;

a circuit responsive to the first signal and connected between the feedback winding and said time constant circuit such that the time constant of said time constant circuit is changed in dependence on the first signal to stabilize the output voltage or output current; and a conducting path provided between an input power-supply voltage supplying section for the primary of said transformer and a voltage-supplying section for said circuit responsive to the first signal.

7. The self-oscillation type switching power supply apparatus of claim 6, wherein said conducting path includes a starting-up resistor connected between said input power-supply voltage supplying section for the primary of said transformer and a controlling voltage inputting section for said switching transistor, and a by-pass circuit comprising a resistor connected between said controlling voltage inputting section for said switching transistor and said voltage-supplying section for said circuit responsive to the first signal.

8. The self-oscillation type switching power supply apparatus of claim 7, wherein a reverse current preventing diode is provided between said circuit responsive to the first signal and said feedback winding, and a reverse current preventing diode is provided in said by-pass circuit.

9. The self-oscillation type switching power supply apparatus of claim 6 further comprising an overcurrent protecting circuit coupled between the time constant circuit and said feedback winding for assuring an upper limit of a charging time constant for the time constant circuit.

10. The self-oscillation type switching power supply apparatus of claim 9, wherein the overcurrent protecting circuit comprises a diode coupled in series with a parallel circuit comprising a first resistor and zener diode coupled in parallel with a second resistor and coupled to the time constant circuit.

11. A method of preventing voltage overshoot in an output voltage of a self-oscillation type switching power supply apparatus, the self-oscillation type switching power supply apparatus having a transformer having a primary winding, a secondary winding, and a feedback winding; a switching transistor for interrupting a current in said primary winding; a controlling transistor for controlling a positive feedback signal for said switching transistor from said feedback winding; a time constant circuit adapted to be charged at a predetermined time constant and to provide a controlling voltage to said controlling transistor; a first circuit for detecting an output voltage or output current from the secondary of said transformer; and a second circuit connected between the feedback winding and said time constant circuit such that the time constant of said time constant circuit is changed in dependence on the detection of the output voltage or output current to stabilize the output voltage or output current; the method comprising the steps of:

providing a first signal from said first circuit related to the output voltage or output current from the secondary of said transformer;

receiving the first signal in the second circuit and changing the time constant of the time constant circuit in dependence on said first signal; and providing a voltage on a conducting path provided between an input power-supply voltage supplying section for the primary of said transformer and a voltage-supplying section for said second circuit thereby to control said controlling transistor to turn off said switching transistor to prevent voltage overshoot.

12. The method of claim 11, further comprising preventing a reverse current from flowing between said second circuit and said feedback winding, and preventing a reverse current from flowing in said by-pass circuit back to said switching transistor.

13. The method of claim 11, further comprising providing an upper limit of the charging time constant for the time constant circuit by providing an overcurrent protecting circuit coupled between the time constant circuit and said feed back winding.

14. The method of claim 11 wherein the first circuit comprises a photo-transmitter of a photocoupler and the second circuit comprises a photo-detector of the photocoupler, the first signal comprising a light signal transmitted between the photo-transmitter and photo-detector and the step of providing a voltage through a conducting path comprises providing said voltage to a voltage-supplying section for the photo-detector to affect the current flowing in said photo-detector thereby to change the time constant of the time constant circuit.

15. The method of claim 11, wherein the step of providing a voltage through a conducting path comprises controlling said controlling transistor so as to turn off said switching transistor when an input voltage to the self-oscillation type switching power supply decreases, thereby to prevent voltage overshoot in said output voltage.

16. The self-oscillation type switching power supply apparatus of claim 1, wherein said conducting path makes a current flow from said input power supply section of the primary of said transformer to said voltage-supply section for said photodetector.

17. The self-oscillation type switching power supply apparatus of claim 6, wherein said conducting path makes a current flow from said input power-supply section of the primary of said transformer to said voltage-supply section for said photodetector.

18. The method of claim 11, wherein said conducting path makes a current flow from said input power-supplying section of the primary of said transformer of said voltage-supply section for said photodetector.

19. The self-oscillation type switching power supply of claim 16, wherein the conducting path is a DC conducting path.

20. The self-oscillation type switching power supply of claim 17, wherein the conducting path is a DC conducting path.

21. The method of claim 18, wherein the conducting path is a DC conducting path.

* * * * *